(No Model.)

W. R. RONEY.
PYROMETER.

No. 490,723. Patented Jan. 31, 1893.

Witnesses:
Louis M. F. Whitehead
J. B. Weir.

Inventor:
William R. Roney
by Dayton Poole & Brown
his Attorneys

UNITED STATES PATENT OFFICE.

WILLIAM R. RONEY, OF CHICAGO, ILLINOIS.

PYROMETER.

SPECIFICATION forming part of Letters Patent No. 490,723, dated January 31, 1893.

Application filed September 25, 1891. Serial No. 406,827. (No model.)

*To all whom it may concern:*

Be it known that I, WILLIAM R. RONEY, of Chicago, in the county of Cook and State of Illinois, have invented certain new and useful Improvements in Pyrometers; and I do hereby declare that the following is a full, clear, and exact description thereof, reference being had to the accompanying drawings, and to the letters of reference marked thereon, which form a part of this specification.

This invention relates to devices for determining the temperature of gases in furnaces, boiler and furnace flues, or other inclosures containing heated air or gases. Metal pyrometers heretofore used for this purpose have been found unreliable for the reason, among others, that lack of uniformity in the expansion throughout the length of the compound or expansible rod, owing to variations in temperature at different points in the length of said rod, and also the expansion produced by excessively high temperatures, results in a strain upon the recording mechanism which sometimes causes the indicator to "stick" and fail to return to zero when the rod cools. This destroys its accuracy, and the degree of inaccuracy is multiplied or magnified ordinarily, as it is a common practice for the engineer to set the pointer back to zero by hand, irrespective of the length of the rod. These pyrometers have also given unsatisfactory results owing to the fact that they indicate the temperature of only that part of the flue in which the tube is inserted, and there may be within the flue considerable variations of temperature at different points, so that the real temperature of the flue at various points cannot be accurately taken, even if the pyrometer is accurate.

The object of my invention is to provide means for ascertaining with great accuracy, the temperature of air or gases at any point or various points within a heated inclosure.

To this end the invention consists in the matters described in the ensuing specification, and pointed out particularly in the appended claims.

Figure 1:
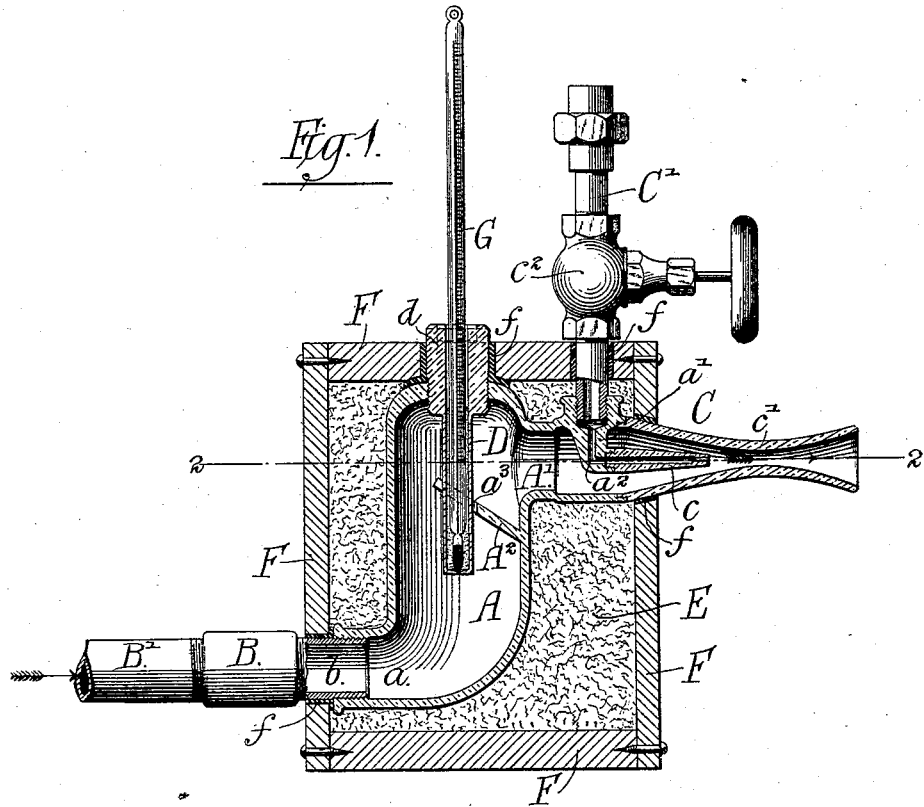
Figure 2:
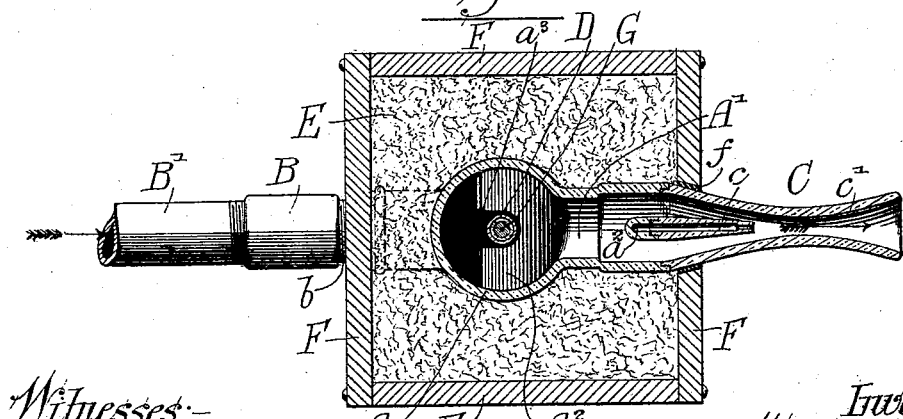

In the accompanying drawings: Figure 1 is a vertical section of an apparatus illustrating the principles of my invention. Fig. 2 is a horizontal section of the same on line 2—2 of Fig. 1.

To carry out my invention I provide a heat chamber into which the heated air or gases from any point in an inclosure may be drawn through a suitable pipe or conduit connected with one end or side of the chamber, by means of an exhaust device connected with the other side or extremity of said heat chamber, and locate within this chamber a heat indicating device visible from the exterior thereof.

In the drawings, I have illustrated one form of device embodying these several features, in which is employed a heat chamber, A, of cast metal and somewhat elongated form. One end of the chamber A is provided with an inlet opening $a$, into which is fitted a short length of pipe, $b$, having a union or coupling B, at its outer end, by means of which a pipe B', of any required length may be connected, and at the other end of the chamber is a tubular outlet, A', to which is attached an ejector C. Said ejector consists of an outer nozzle, $c'$, which is connected with the tubular outlet A', of the chamber and an inner or jet nozzle $c$, which is located centrally within the outer nozzle in the usual manner, and is supported at its inner end by attachment to a projection $a'$ extending into the outlet A' from one side thereof, and preferably cast integral with the wall of said outlet. The said inner or jet nozzle $c$ is connected by a passage $a^2$ formed in the projection $a'$ with a pipe C' leading from the boiler of a furnace or other source supplying steam or air under pressure, said pipe being fitted with a valve $c^2$, by means of which communication between the steam or air supply and the ejector can be established or closed.

An inclined deflector A², projects inwardly from the side wall of the chamber A, its position being such as to intercept a current of air or gas passing from the inlet $a'$ to the outlet A' and ejector C, and deflect said current toward that side of the chamber A opposite the outlet or ejector, thus securing a thorough dissemination of said current throughout said chamber. The edge of this deflector is provided with a concave notch $a^3$ to afford passage for a portion of the hot gases, and space for the location of the heat-measuring devices at the center of the chamber.

Such heat-measuring devices as herein shown are made as follows: A cup D, preferably having the form of a tube closed at its lower end, depends from the top of the chamber A into the latter and passes through the notch $a^3$ of the deflector, but without contact with the same. I have shown this cup D as made of metal and formed integral with a screw-plug $d$ fitted into a tapped hole in the top of the chamber A, but this particular construction is not essential. The cup D is partly filled with a suitable heavy oil, in which the bulb and lower part of the tube of a mercurial thermometer G, are immersed with its upper end or stem extending above or outside of the chamber A, so that it may be easily inspected or read.

The chamber A is surrounded with a packing E, of asbestos, or some other non-conductor of heat, and inclosed by a casing F, of wood. Packings $f$, of asbestos are interposed between said wooden casing and the metal parts $b$, C, C', and $d$, which pass through openings therein, to prevent ignition or charring of the wood.

Any other form of inclosure to prevent the heat chamber from being cooled by contact with the surrounding atmosphere, may, however, be employed in place of that shown.

To ascertain the temperature of the gases in a furnace or flue, or in any part thereof, the pipe C' is connected with the boiler, or some other source or means supplying steam or compressed air through the medium of a flexible pipe or otherwise, and the pipe B' is then thrust the desired distance into the furnace or flue. Upon opening the valve $c'$ in the pipe C' the ejector will be put in operation and exhausts the air from the chamber A, thereby causing the heated gases to be drawn into said chamber from that part of the furnace or flue in immediate proximity to the end of the pipe B'. The chamber A thus receives heated gases having the same temperature as at the point in the furnace or flue from which said gas is withdrawn, as there will be no appreciable loss of heat owing to the rapidity with which said heated gases move through the passages which lead from the flue or furnace to the chamber A. The heated gases in passing through chamber A surround the depending tube D and heat the oil therein to a degree corresponding with the heat of the gases, and thereby cause the thermometer to indicate the degree of temperature of the oil, and consequently the degree of temperature of the gases within the chamber A.

In order to draw the heated gases from points within a furnace or flue at varying distances from the opening through which pipe B' is inserted and at the same time to locate the casing F close to said opening during the operation of the device, to avoid loss of heat by radiation through that part of pipe B' which is exposed to the atmosphere, I construct said pipe B' of a number of short sections detachably coupled, so that by attaching or detaching one or more of said short sections, the desired length of pipe may be readily attained. I also contemplate perforating the end section or sections of pipe in order to draw the heated gases from a greater area.

The case F with the inclosed parts is preferably made light and portable and I prefer to connect the supply pipe C' with the source of steam or compressed air supply by means of a flexible pipe, as this enables me to easily and conveniently handle the apparatus when in use.

It will be understood that I do not confine myself to the details of construction hereinbefore described, as many changes may be made without departing from the principles of my invention, as for instance, the relative positions of the inlet and outlet openings may be changed, and some other form of air exhausting apparatus may be used in lieu of the ejector shown. The mercurial thermometer may also be replaced by any other well known means for indicating the temperature.

What I claim is:—

1. The combination of a chamber adapted for connection with a heated inclosure, a closed tube or cup projecting within the chamber, and an air exhausting device connected with the chamber, substantially as described.

2. The combination of a chamber, a closed tube or cap projecting within the chamber, an air exhausting device connected with the chamber, and a pipe attached to the chamber and adapted for insertion into a heated inclosure, substantially as described.

3. The combination of a chamber having an inlet and outlet, an air exhausting device connected with the outlet, a heat indicating device projecting within the chamber, and a deflector located within the chamber between said inlet and outlet, substantially as described.

4. The combination of a chamber having an inlet and outlet, an air exhausting device connected with said outlet, a notched deflector located between said inlet and outlet, and a heat indicating device projecting within the chamber and passing loosely through the notch of the deflector, substantially as described.

5. The combination of a chamber, a closed tube or cup projecting within the chamber, an air exhausting device connected with the chamber and a pipe, attached to the chamber and consisting of short detachable sections, whereby any desired portion of the heated chamber may be reached by said pipe, substantially as described.

6. The combination of a chamber adapted for connection with a heated inclosure, an air exhausting device connected with said chamber, a tubular cup projecting within the chamber, and a thermometer located within said cup, substantially as described.

7. The combination of a chamber, a closed tube or cup projecting within said chamber and a thermometer located within said cup, an exhausting device connected with the chamber, a non-conducting covering surrounding the chamber, and a case inclosing said non-conducting covering, substantially as described.

In testimony that I claim the foregoing as my invention I affix my signature in presence of two witnesses.

WILLIAM R. RONEY.

Witnesses:
   ROBERT C. ROESE,
   IDA M. STUART.